May 1, 1934.  J. C. CROWLEY  1,956,981
POSITIONING MEMBER FOR VALVE MECHANISMS
Filed Sept. 10, 1928  2 Sheets-Sheet 1
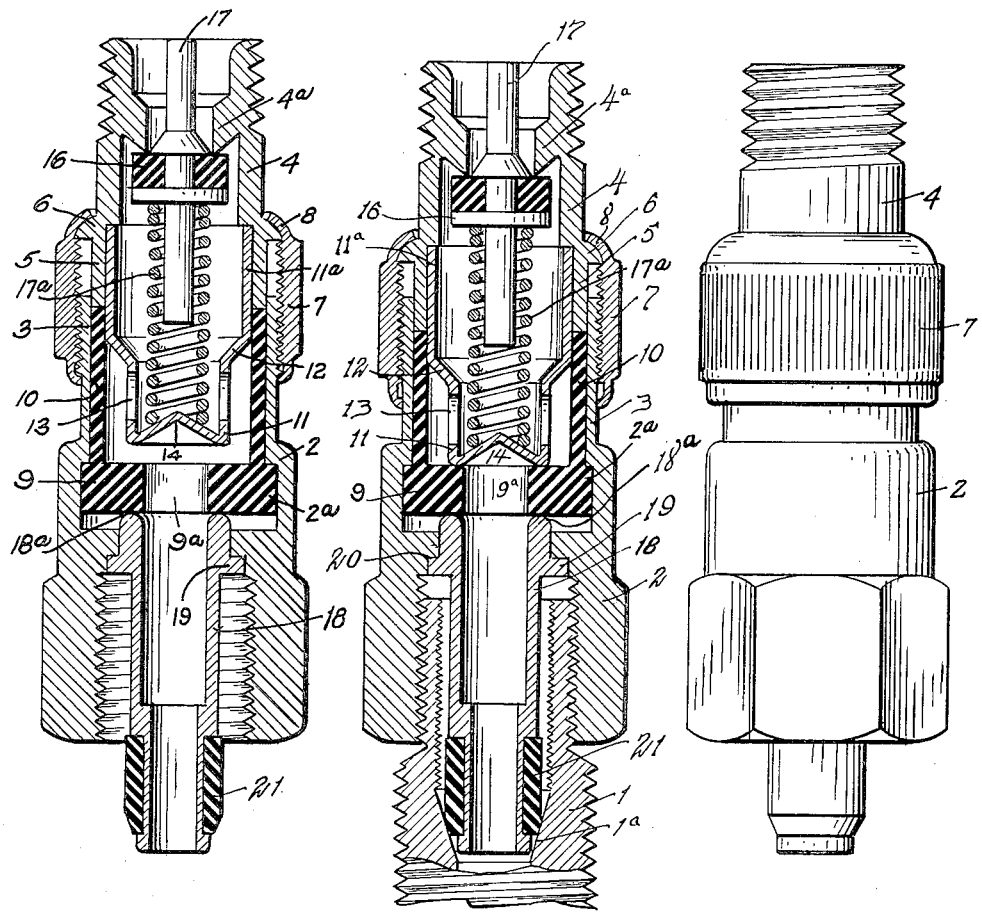
INVENTOR
John C. Crowley
BY
Kwis Hudson & Kent
ATTORNEYS May 1, 1934. J. C. CROWLEY 1,956,981
POSITIONING MEMBER FOR VALVE MECHANISMS
Filed Sept. 10, 1928   2 Sheets-Sheet 2
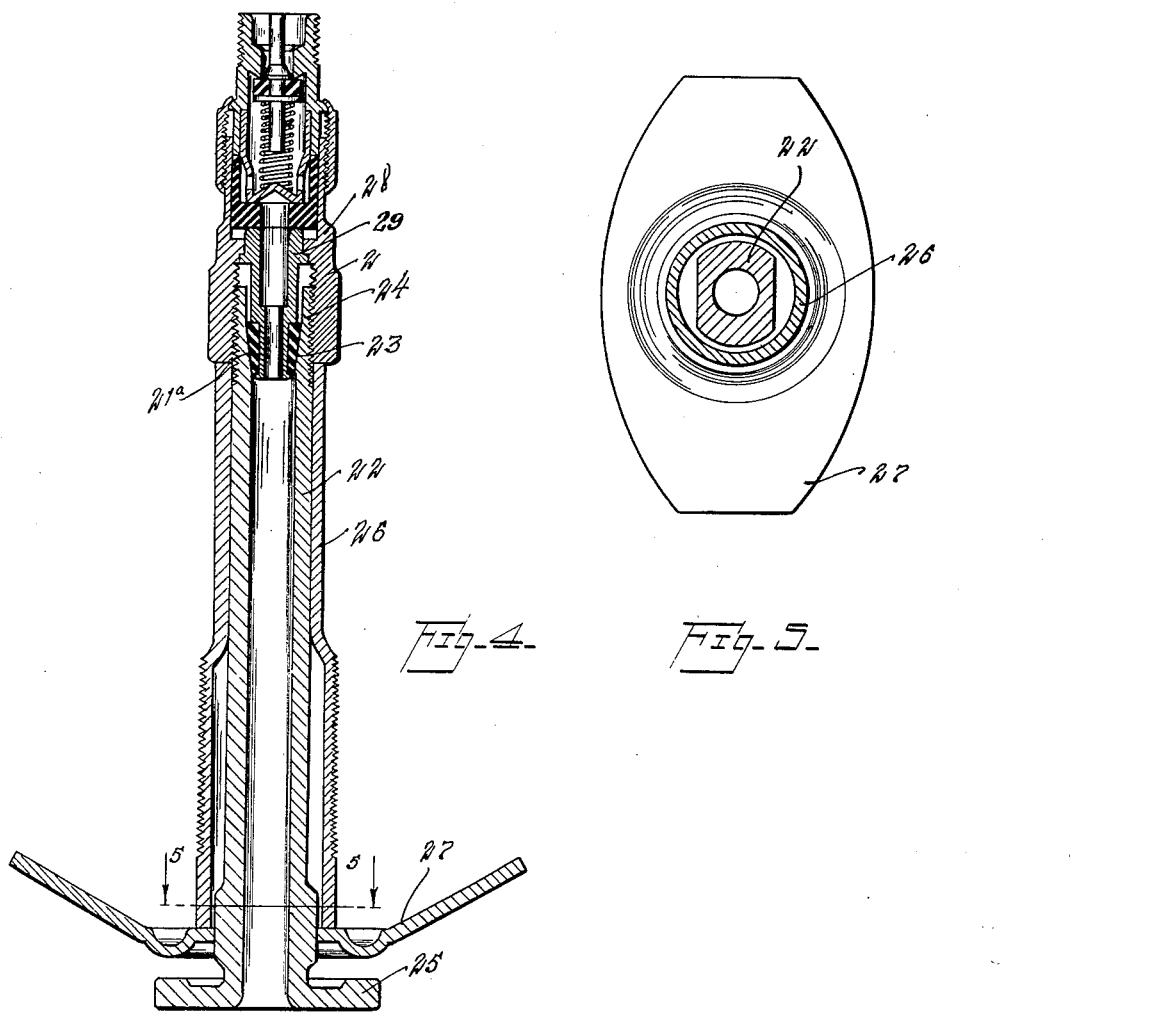
INVENTOR
John C. Crowley
BY
Kivon Hudson & Kent
ATTORNEYS Patented May 1, 1934

1,956,981

UNITED STATES PATENT OFFICE 1,956,981

POSITIONING MEMBER FOR VALVE MECHANISMS

John C. Crowley, Cleveland Heights, Ohio, assignor to The Dill Manufacturing Company, Cleveland, Ohio, a corporation of Ohio Application September 10, 1928, Serial No. 304,955

4 Claims. (Cl. 152—12)

The present invention relates to valve mechanism which may be used in connection with valve stems for inner tubes of pneumatic tires, or under any other condition where a valve stem is used to inflate a rubber bag or casing.

More particularly the invention relates to what may be termed a positioning member for use in connection with a valve mechanism such as is described and claimed in my copending application, Serial Number 278,072, filed May 16, 1928 and my co-pending application Serial No. 272,594, filed April 25, 1928, although it will be obvious that the positioning member may be used with other forms of valve mechanisms and valve stems than that shown and described in the aforesaid applications.

Broadly speaking, it may be said that the positioning member is adapted to be used in connection with any form of valve stem in which a valve mechanism is mounted at and upon the end of the stem, and the purpose of the positioning member is to insure a definite position of the packing elements of a valve mechanism with respect to the stem, so as to insure an efficient and complete air-tight packing regardless of variations in the length of the valve stem.

Reference should be had to the accompanying drawings forming a part of this specification, in which, Figure 1 is a sectional elevation with the valve mechanism in open position.

Figure 2 is a sectional elevation with the valve mechanism in closed position.

Figure 3 is a front elevation.

Figure 4 is a sectional elevation showing the application of the invention to a modified form of construction.

Fig. 5 is a section upon the line 5—5 of Figure 4.

In the present description I have elected to disclose the invention as it will be used in connection with a valve mechanism, such as described in my co-pending application Ser. No. 278,072 before mentioned, without in any way intending to limit the invention to that specific form of valve mechanism.

Mounted upon the end of the valve stem is a casing 2, and this casing has, in the form shown, internal threads which cooperate with threads upon the valve stem. The casing 2 has a circular wall 3 upon the outer surface of which threads are provided.

A movable member 4 which has a hollow interior, is provided with a depending flange 5, the outer diameter being such that it may fit within the upstanding flange 3 of the member 2. The member 4 has an outwardly extending rib or ridge 6. Cooperating with the member 4 and the flange 3 of the member 2 is an external annular member 7 which, upon the outer surface thereof, is knurled so as to provide a convenient finger grip. This member, upon the interior surface, is provided with threads which are adapted to engage with the threads formed upon the flange 3.

The member 7 is adapted to cooperate with the external annular rib 6. The rib 6 extends upon the interior portion of the member 7, and the member 7 has a part 8 which is bent or otherwise formed around the rib 6, so as to retain the members 4 and 7 against separation, at the same time forming a swivel connection. It should be noted that the extension 6 on the member 4 is located above the threads which are formed on the interior surface of the member 7, so that the member 4 is definitely secured with respect to the member 7, so that longitudinal movement of the member will effect longitudinal movement of the member 4. However, the connection is such that the member 7 may swivel upon the member 4.

It will be obvious from the foregoing description that as the member 7 is turned, it will move longitudinally upon the flange 3 of the member 2 and the rotary movement of the member 7 will cause longitudinal movement of the member 4.

Within the casing 2 is a cup-shaped packing member made of suitable resilient material, which has a heavy base portion 9, which forms the packing proper and an upstanding flange 10 which lies against the upstanding flange 3 of the member 2. The packing member 9 is somewhat dish-shaped in form, and is provided with a central opening 9a. The periphery of the packing 9 engages within a groove 2a formed in the inner surface of the member 2.

Within the member 4 there is secured a plunger, generally indicated at 11. This plunger is provided with a flange 11a which fits within the flange 5 of the member 4 and is secured therein, so that the plunger 11 will move with the member 4. The plunger 11 also has a slanting face 12, a part of which lies directly upon the upstanding flange 10 of the packing member.

The lower part of the plunger 11 is provided with air openings 13, and has a reentrant conical portion 14 which provides an annular bottom portion as at 15, which is adapted to engage with the packing member 9, so as to provide an air seal when the valve mechanism is in closed position.

The plunger 11 is hollow and within the same is a check valve 16 having a stem 17. Within the member 4 there is an inwardly extending annular portion 4a, which forms a seat that cooperates with the check valve 16. The check valve is normally held to its seat by means of a spring 17a, one end of which bears against the check valve and the other end of which seats around the conical reentrant portion 14. The valve stem 17 extends outwardly to adjacent the end of the member 4, and is in position to be displaced when an inflating chuck or pump connection is attached to the end of the member 4. As will be noted, the end of the member 4 is provided with threads which are adapted for connection with a pump coupling, and also may receive a closing cap.

In the application Serial No. 278,072 the packing gasket 9 is adapted to cooperate with the end of a valve stem but it frequently happens that valve stems are not of uniform length, and where such is the case it may happen that in screwing the member 2 down upon the end of the valve stem 1, the member 2 will be screwed upon the valve stem as far as is possible and still not provide an efficient and air-tight contact between the gasket 9 and the end of the valve stem. This may be overcome by providing the construction which will now be described.

The positioning member, as I have termed it, embraces a body portion 18 which is hollow, and at its upper end is provided with rounding ends 18a, which are adapted to engage with the under side of the gasket 9. The member 18 is provided with an annular flange 19, which is adapted to fit within a suitable recess 20 formed in the member 2. The opposite end of the member 18 is provided with an annular packing member 21, which is adapted to engage with the usual beveled shoulder 1a, which forms a part of the usual and standard valve stem.

It will be seen that if the valve mechanism, together with the positioning member, is mounted upon a valve stem such as the valve stem 1, the annular packing member 21 will engage with the beveled shoulders 1a to secure an efficient, air-tight packing of the lower end of the positioning member 18, and this will be effected by the inward thrust placed upon the member 18 as the part 2 of the valve mechanism is screwed on the end of the valve stem 1.

At the same time the upper end of the member 18 will engage with the under surface of the gasket 9, being pressed into effective air-tight contact as the member 2 is screwed upon the end of the valve stem 1. From the foregoing description it will be seen that the positioning member 18 will provide an efficient, air-tight packing relation with respect to the gasket 9, irrespective of the length of the valve stem.

In Figure 4 I have shown the positioning member as it may be used in connection with a valve stem other than the standard valve stem, the valve stem shown and which will be described being substantially the same as the valve stem which is shown in my co-pending application Serial No. 272,594 to which reference has before been made.

Referring to Figure 4 the valve stem comprises a tubular member 22 which is formed with an inner bore and adjacent its outer end is formed with a beveled shoulder 23. The end of the valve stem to which reference has just been made is provided with threads 24, upon the exterior surface thereof. At the opposite end the valve stem is provided with a head 25, which is made the same as the head provided upon the usual standard valve stem.

Surrounding the stem 22 there is a casing 26, which, at its lower end, engages with a spreader 27, and where desired, the spreader may be made integral with the member 26, as shown in my co-pending application Ser. No. 272,594 to which reference has before been made.

At the outer end of the stem 22 there is mounted a valve mechanism, which I have generally represented by the reference numeral 28, and it will not be necessary to describe this valve mechanism in detail, as it has been before described in connection with the disclosures shown in Figures 1 to 3 inclusive.

In connection with a valve stem such as has just been described, the portion 2 of the valve mechanism serves to force the member 26 and the spreader 27 toward the head 25, so that when the valve stem is used in connection with an inner tube or similar device, portions of the inner tube are clamped and held between the spreader and the head 25.

As described in the co-pending application, to which reference has just been made, the construction provides an efficient means for taking up any looseness with respect to the clamping action of the spreader, by simply turning the member 2, which, being positioned at the end of the valve stem, is easily accomplished without removing the inner tube from the tire casing, which would, of course, necessitate removing the tire casing from the wheel upon which it was mounted.

In connection with such a valve stem as has been described, the positioning member 29 is mounted with respect to the valve mechanism in precisely the same relation as that described in connection with Figures 1 and 2, and the packing member 21a is adapted to engage with the beveled shoulders 23 in the valve stem in precisely the same manner as that described in connection with the disclosure in Figure 2 of the drawings.

It will be obvious that various modifications departing from the precise construction herein shown and described may be made without departing from the spirit of the invention.

Having thus described my invention I claim:

1. In combination, a valve mechanism comprising a casing adapted to be secured to a valve stem and provided with a longitudinal bore therethrough, a groove in the wall of said bore, a tubular positioning member for said casing having a longitudinal bore therethrough and an end which extends into the bore of said casing and an end adapted to extend into the valve stem, said last mentioned end of the member having a portion adapted to engage the wall of the valve stem bore to form an air seal between said member and valve stem, and a gasket in the bore of said casing engaging said groove and the end of said member and tightly pressing against the latter when the casing is secured to the valve stem to form an air seal between said member and said casing.

2. In combination, a valve mechanism adapted to be mounted upon the end of a valve stem and comprising a casing provided with a longitudinal bore having a threaded portion to enable the casing to be screwed upon the valve stem, an annular shoulder in said bore adjacent the inner end of the threaded portion thereof, a groove in the wall of said bore inwardly of said shoulder, a tubular positioning member for said casing having a longitudinal bore therethrough and an end which extends into the bore of said casing beyond said shoulder, said member having a shoulder engaging the shoulder in the bore of the casing the other end of said member being provided with a gasket adapted to engage the wall of the valve stem bore to form an air seal between said stem and member, and a gasket in the bore of said casing intermediate said groove and said annular shoulder therein and engaging the end of said member, said gasket being tightly pressed against the end of said member when the casing is screwed upon the valve stem to form an air seal between said casing and said member.

3. In combination, a valve mechanism comprising a casing adapted to be secured to a valve stem and provided with a longitudinal bore therethrough, a gasket arranged in the bore of said casing, said casing being provided with means for limiting the movement of said gasket axially in the bore thereof, a tubular positioning member for said casing having a longitudinal bore therethrough and an end which extends into the bore of said casing and an end adapted to extend into the valve stem, said last mentioned end of the member having a portion adapted to engage the wall of the valve stem bore to form an air seal between said member and stem, and said gasket engaging the first named end of said member and tightly pressing against the latter when the casing is secured to the valve stem to form an air seal between said member and said casing.

4. In combination, a valve mechanism comprising a casing adapted to be secured to a valve stem and having a longitudinal bore therethrough and provided intermediate its ends in said bore with an internal shoulder, a tubular positioning member for said casing having a longitudinal bore therethrough and an end which extends into the bore of said casing and an end adapted to extend into the valve stem, said member being provided adjacent its first mentioned end with an external shoulder adapted to engage the internal shoulder of said casing and with means on said last mentioned end adapted to engage the wall of the valve stem bore to form an air seal between said stem and member, a gasket in the bore in said casing, and means in said casing limiting movement of said gasket axially in the bore thereof, said gasket engaging the first named end of said member and tightly pressing against the latter when the casing is screwed down upon the valve stem to form an air seal between said casing and said member.

JOHN C. CROWLEY.